(12) United States Patent
Nakamura et al.

(10) Patent No.: US 7,092,012 B2
(45) Date of Patent: Aug. 15, 2006

(54) IMAGE PROCESSING APPARATUS AND METHOD, STORAGE MEDIUM, AND COMMUNICATION SYSTEM

(75) Inventors: Shuichi Nakamura, Kawasaki (JP); Osamu Morimoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/965,213

(22) Filed: Nov. 6, 1997

(65) Prior Publication Data

US 2003/0025803 A1    Feb. 6, 2003

(30) Foreign Application Priority Data

Nov. 15, 1996  (JP)  ................................. 8-304705
Nov. 28, 1996  (JP)  ................................. 8-317900

(51) Int. Cl.
    *H04N 5/232*    (2006.01)

(52) U.S. Cl. ................. 348/211.3; 348/218.1; 348/333.05

(58) Field of Classification Search ........... 348/36–39, 348/46–50, 51, 52, 207, 211–213, 218, 222, 348/231, 232, 552, 14.01, 14.03, 14.05, 14.07, 348/14.08, 207.99, 207.1, 207.11, 211.99, 348/211.1–211.3, 211.8–211.11, 384.1
See application file for complete search history.

(56) References Cited

U.S. PATENT DOCUMENTS

| | | | | |
|---|---|---|---|---|
| 3,697,678 A | * | 10/1972 | Belleson | 345/161 |
| 3,983,328 A | * | 9/1976 | Newell | 348/22 |
| 4,393,394 A | * | 7/1983 | McCoy | 348/587 |
| 4,400,727 A | * | 8/1983 | Aron | 348/117 |
| 5,187,571 A | * | 2/1993 | Braun et al. | 348/39 |
| 5,262,867 A | * | 11/1993 | Kojima | 348/39 |
| 5,432,871 A | * | 7/1995 | Novik | 348/14.13 |
| 5,737,011 A | * | 4/1998 | Lukacs | 348/14.09 |
| 5,815,205 A | * | 9/1998 | Hashimoto | 348/552 |
| 5,880,778 A | * | 3/1999 | Akagi | 348/218 |
| 5,930,405 A | | 7/1999 | Chida | |
| 5,963,250 A | * | 10/1999 | Parker | 348/211 |
| 6,023,287 A | * | 2/2000 | Kimura | 348/39 |
| 6,043,837 A | * | 3/2000 | Driscoll, Jr. | 348/36 |

(Continued)

FOREIGN PATENT DOCUMENTS

JP    7222137    8/1995

(Continued)

OTHER PUBLICATIONS

An Office Action dated Jan. 24, 2006 from the Japanese Patent Office for Appl. No. 08-304705.

(Continued)

*Primary Examiner*—Tuan Ho
*Assistant Examiner*—Jason Whipkey
(74) *Attorney, Agent, or Firm*—Morgan & Finnegan, L.L.P.

(57) ABSTRACT

An image processing apparatus which can be connected to a plurality of terminals, comprising an input unit for inputting the image data representing the image corresponding to a predetermined range by causing a predetermined camera unit to photograph or take each of plural partial areas obtained by dividing the image corresponding to the predetermined range, a reception unit for receiving commands representing positions in the predetermined range from a plurality of terminals, an extraction unit for extracting the image data corresponding to a part of the predetermined range on the basis of the command received by the reception unit and a transmission control unit for causing a predetermined transmission unit to transmit the image data extracted by the extraction means, to the terminal which transmitted the command corresponding to the image data.

21 Claims, 16 Drawing Sheets

U.S. PATENT DOCUMENTS

| | | | | |
|---|---|---|---|---|
| 6,133,943 | A * | 10/2000 | Needham | 348/37 |
| 6,133,944 | A * | 10/2000 | Braun | 348/39 |
| 6,137,485 | A * | 10/2000 | Kawai | 348/207.99 |
| 6,208,372 | B1 * | 3/2001 | Barractough | 348/14.16 |
| 6,209,048 | B1 * | 3/2001 | Wolff | 710/62 |
| 6,219,089 | B1 * | 4/2001 | Driscoll, Jr. | 348/36 |
| 6,256,066 | B1 * | 7/2001 | Yukawa | 348/340 |
| 6,337,708 | B1 * | 1/2002 | Furlan | 348/36 |
| 6,337,709 | B1 | 1/2002 | Yamaashi et al. | |
| 6,522,787 | B1 * | 2/2003 | Kumar et al. | 382/268 |
| 6,542,184 | B1 * | 4/2003 | Driscoll | 348/207.1 |
| 6,549,681 | B1 * | 4/2003 | Takiguchi et al. | 382/294 |
| 6,567,121 | B1 * | 5/2003 | Kuno | 348/207.1 |
| 6,768,563 | B1 | 7/2004 | Murata et al. | |

FOREIGN PATENT DOCUMENTS

| | | |
|---|---|---|
| JP | 8214201 | 8/1996 |
| JP | 8223466 | 8/1996 |
| JP | 8237590 | 9/1996 |

OTHER PUBLICATIONS

English translation of portions of the Jan. 24, 2006 Office Action.

An Office Action dated Jan. 10, 2006 from the Japanese Patent Office for Appl. No. 08-317900.

English translation of portions of the Jan. 10, 2006 Office Action.

* cited by examiner

IMAGE PROCESSING APPARATUS AND METHOD, STORAGE MEDIUM, AND COMMUNICATION SYSTEM

BACKGROUND OF THE INVENTION

1. Field of the Invention

The present invention relates to an information processing apparatus, an information processing method, a storage medium for storing a program to realize such the method, and a communication system, which can transmit and receive an image through a communication line.

2. Related Background Art (First Background Art)

Conventionally, it has been known an image processing apparatus which utilizes one camera as an image input device of plural image reception terminals.

In such the apparatus, following methods can be provided to respond to various requests which are sent from the plural reception terminals and concern various photographing ranges.

For example, in one method, the camera is fitted with a fisheye lens, an image is photographed through the fisheye lens in a wide angle, the photographed image is divided into plural images in accordance with the photographing-range requests from the plural image reception terminals, peripheral distortion of the divided images are corrected, and the corrected images are utilized. In the other method, a universal head of the camera is made movable, an operation (or utilization) right of the camera is set, the operation right is time-divided, the time-divided right is allocated to each reception terminals, and then each terminal utilizes the camera during an allocated time.

(Second Background Art)

Further, it has been conventionally known a system which can receive a video camera image from a remote location and display the received image. In addition to the displaying of the camera image from the remote location, such the system can designate camera controlling parameters such as a pan angle, a tilt angle, zooming magnification and the like of the remote-location video camera.

For example, there is an image communication system in which a computer-controllable camera is connected to a server terminal (i.e., camera server terminal) operating under WWW (world wide web) on an internet, a real-time image obtained from the camera can be transmitted to a user terminal (i.e., image reception side) which accessed the server terminal, and further the camera can be controlled from the user terminal.

In such the system, as a method for a user to input a control signal for the camera controlling, it has been known a method that the camera controlling parameters such as the pan angle, the tilt angle, the zooming magnification and the like are directly designated as numerals from an input apparatus such as a keyboard or the like, or the camera controlling parameters are designated based on a software by adjusting a button or a scroll bar.

Also, it has been known a method that a map image or a wide visual field image previously provided on the camera server side is displayed on the user terminal side, and thus the user designates coordinate positions on the displayed image to designate the camera controlling parameters.

(Problem in First Background Art)

However, in the conventional method which uses the fisheye lens, since the image data photographed by the limited number of light reception elements such as CCD elements or the like is further divided and then utilized, resolution of the image which can be photographed by the fisheye lens itself must be previously made high, whereby cost increases.

Further, in the conventional method which allocates the operation right to each reception terminal, as the number of the reception terminals increases, the allocated time to each reception terminal is shortened.

(Problem in Second Background Art)

Further, in the conventional method, if communication speed for transmitting a video signal is low, or if process speed of the server terminal or the user terminal is low, it takes extra time to display on the user terminal an image which reflects the camera controlling parameters inputted by the user, whereby it is difficult for the user during such the time to know or grasp what kind of image is being within a photographable range.

SUMMARY OF THE INVENTION

In consideration of the above-described plural conventional problems, in a system for transmitting and receiving an image through a communication line, an object of the present invention to improve usage of a terminal which requests image data, by effectively photographing the images existing within a photographable range of a camera or the like and holding the photographed images as the image data.

Concretely, in the case where the image data which represents the image according to a range requested by each reception terminal is generated from the wide-range image and transmitted to each reception terminal, the object of the present invention is to be able to transmit the image data within the photographing range requested by each reception terminal and to transmit such the image data to each reception terminal with simple structure, even if the number of the reception terminal increased.

In order to achieve the above object, according to one preferred embodiment of the present invention, it is provided an information processing apparatus which can be connected to the plural terminals, comprising:

an input means for inputting the image data representing the image corresponding to a predetermined range, by causing a predetermined camera means to photograph each of plural partial areas obtained by dividing the image corresponding to the predetermined range;

a reception means for receiving commands representing positions in the predetermined range, from the plural terminals;

an extraction means for extracting the image data corresponding to a part of the predetermined range, on the basis of the command received by the reception means; and a transmission control means for causing a predetermined transmission means to transmit the image data extracted by the extraction means, to the terminal which transmitted the command corresponding to such the image data.

An another object of the present invention is to provide a system in which it can be easily known or grasped what image or picture exists within the photographable range by the camera or the like.

In order to achieve the above object, according to one preferred embodiment of the present invention, it is provided a communication system which is composed of a transmission apparatus for transmitting the image photographed by an image pickup means and a reception apparatus for receiving the image from the transmission apparatus through a communication line and displaying the received image, wherein the reception apparatus comprises a display control means for causing a predetermined display means to display the wide-range image which was generated and transmitted by the transmission apparatus, and the transmission apparatus comprises, a photographing control means for causing a predetermined camera means to photograph each of plural partial images constructing the wide-range image, a generation means for generating the wide-range image by using the plural partial images obtained by the photographing of the predetermined camera means, and a transmission means for transmitting the wide-range image generated by the generation means to the reception apparatus.

The above and other objects, features, and advantages of the present invention will be apparent from the detailed description and the appended claims in conjunction with the accompanying drawings.

DETAILED DESCRIPTION OF THE PREFERRED EMBODIMENTS

First Embodiment

Hereinafter, the first embodiment of the present invention will be described with reference to the accompanying drawings.

Figure 1:
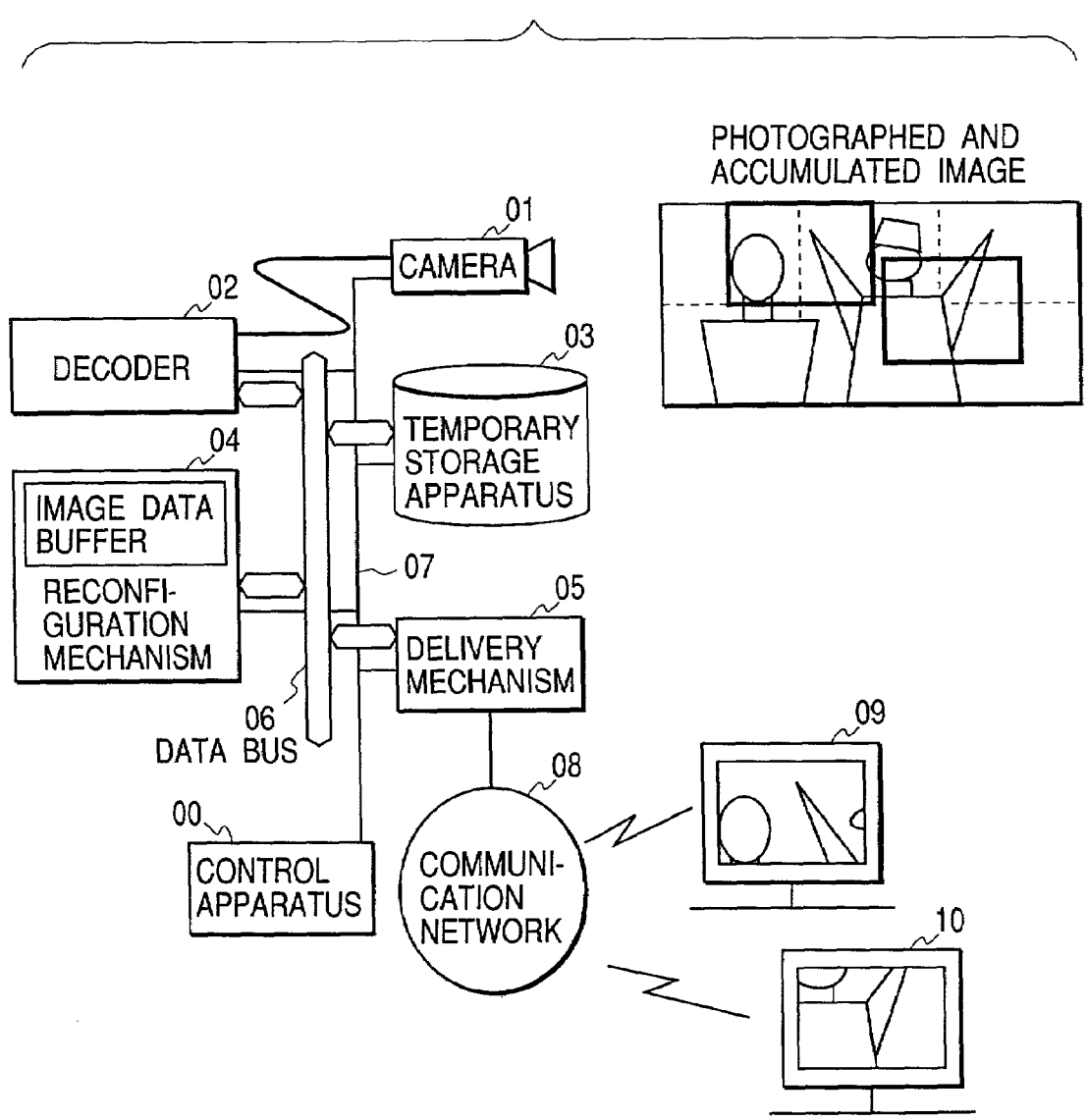
FIG. 1 is a block diagram showing structure of an image delivery system.

FIG. 1 is a block diagram showing a system for realizing the present embodiment.

In FIG. 1, a camera 01 is a video camera which can photograph (or take) a still image and a moving image (or animation). A pan and a tilt of the camera 01 can be controlled by a computer. A decoder 02 can convert an image photographed by the camera 01 into digital image data of arbitrary format.

A temporary storage apparatus 03 is the storage apparatus such as a DRAM, a hard disk or the like which can temporarily store (or accumulate) the digital image data converted by the decoder 02.

An image reconfiguration mechanism 04 reconfigures the digital image data temporarily stored in the temporary storage apparatus 03, into the digital image data within a range which is requested from a reception terminal at an independent delivery destination. An image delivery mechanism 05 is the delivery mechanism which can transfer the digital image data reconfigured by the mechanism 04, to the reception terminals of the plural delivery destinations through a communication network. These reception terminals are shown as terminals 09 and 10 in FIG. 1, but may be three or more terminals in the present embodiment.

Each of the reception terminals 09 and 10 is an image display system which receives and displays the digital image data transferred from the image delivery mechanism 05. A control apparatus 00 controls the camera 01, the decoder 02, the temporary storage apparatus 03, the image reconfiguration mechanism 04 and the image delivery mechanism 05 through a control bus 07.

A data bus 06 connects the camera 01, the decoder 02, the temporary storage apparatus 03, the image reconfiguration mechanism 04 and the image delivery mechanism 05, and allows data transmitting/receiving of such connected units in the order of the camera, the decoder, the temporary storage apparatus, the image reconfiguration mechanism and the image delivery mechanism. Further, a communication network 08 connects the image delivery mechanism 05 to the plural reception terminals 09 and 10.

In the digital image delivery system of the present embodiment having such the structure as shown in FIG. 1, an entire range which is photographable when a universal head of the camera 01 is movable is sequentially photographed by moving the universal head, and the digital image data obtained by converting the photographed image with the decoder is temporarily stored in the temporary storage apparatus. Then, in the digital image data within the photographing ranges which were respectively requested from the plural delivery destinations, the digital data corresponding to each request is delivered, so that the images of the plural photographing ranges can be provided respectively to the plural delivery destinations.

In the present embodiment, the camera 01 is the video camera which outputs analog image data of, e.g., NTSC format, and the outputted analog image data is A/D converted by the decoder into the digital image data. However, the present invention is not limited to such a method. That is, it may be applied a method in which the video camera directly outputs the digital image data of digital video format and no A/D converting is performed by the decoder.

Figure 2:
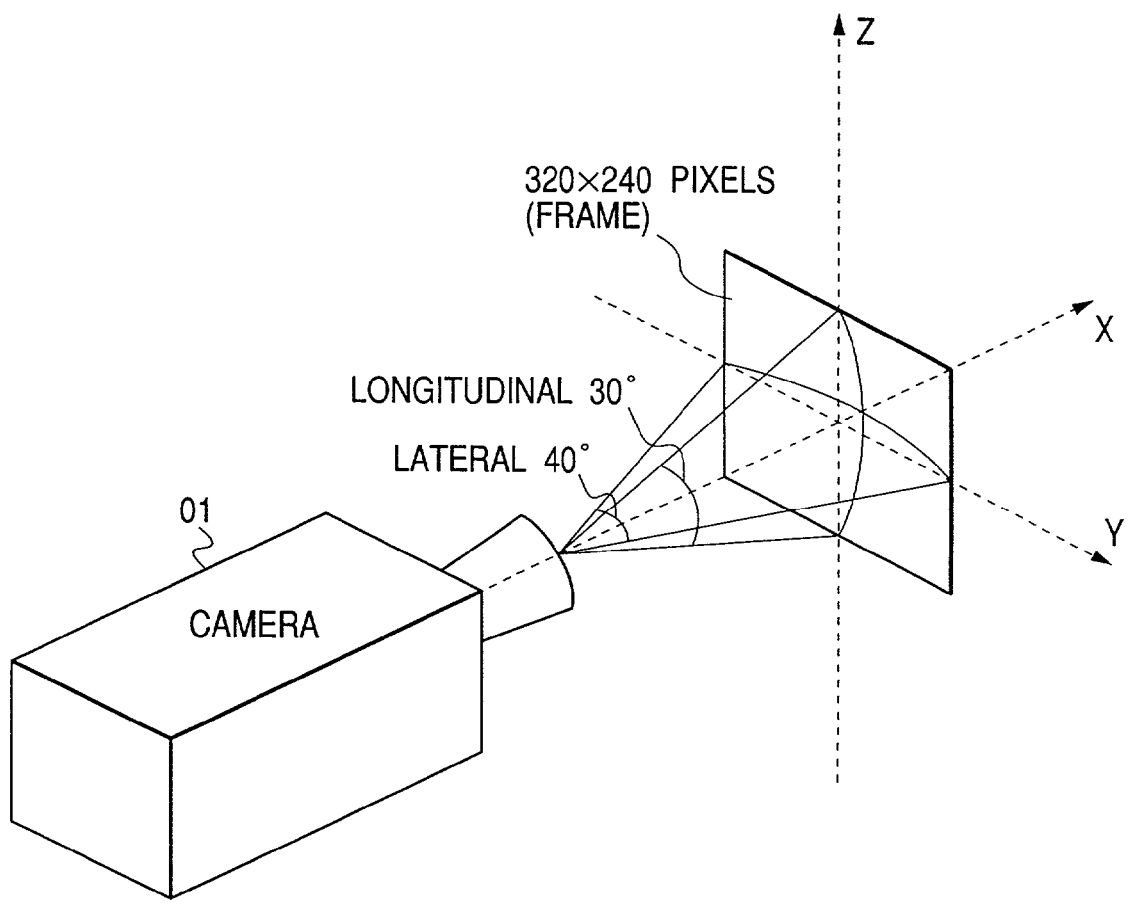
FIG. 2 is a view showing a photographing range of a camera when a universal head of the camera is fixed.
Figure 3:
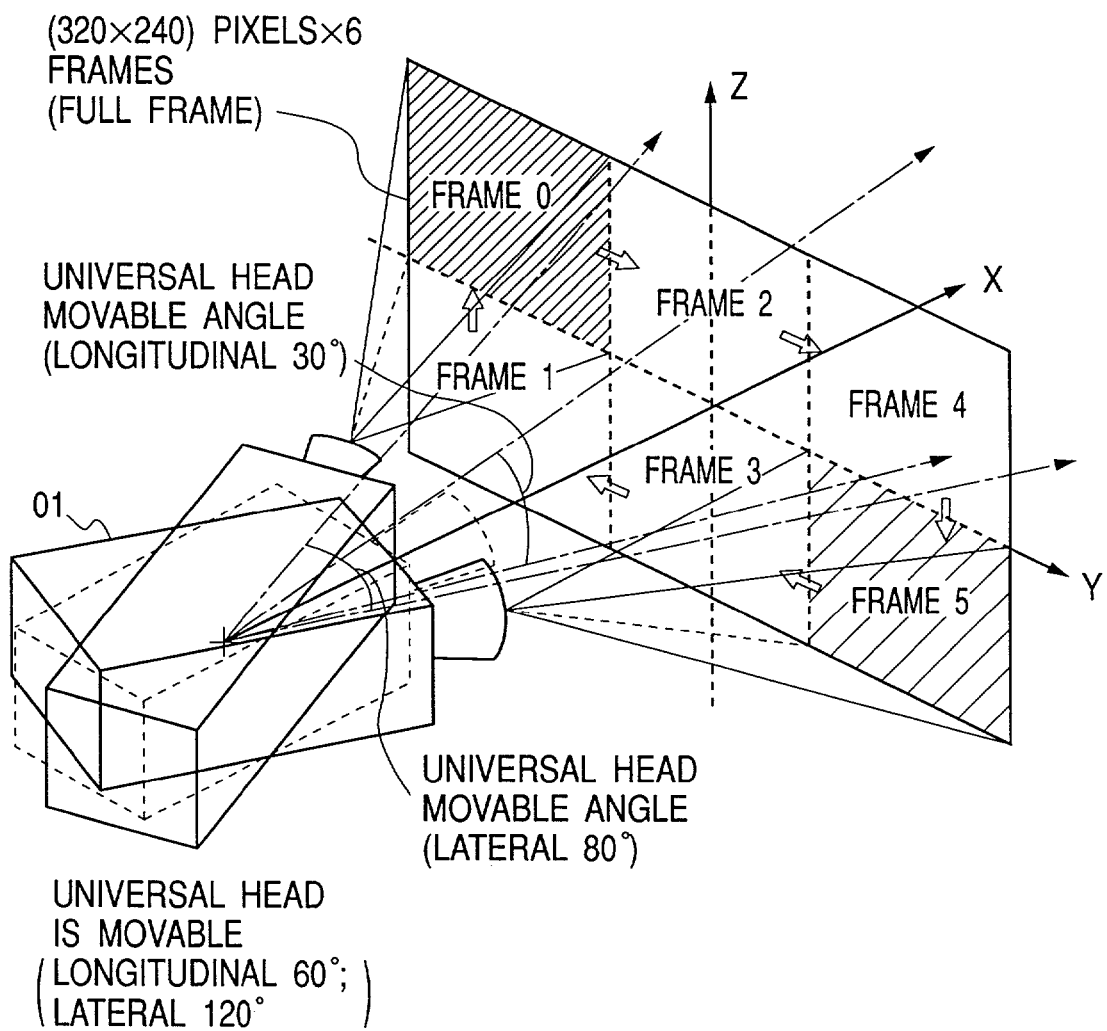
FIG. 3 is a view showing the photographing range of the camera when the universal head of the camera is movable.

FIGS. 2 and 3 are views showing the photographing range of the camera. For example, when the universal head is fixed, the camera 01 can perform the photographing within a range (longitudinally 30° and laterally 40° in visual field angle, i.e., 320×240 pixels; called as one frame hereinafter) shown in FIG. 2. Further, for example, when the universal head is moved laterally 80° and longitudinally 30°, the camera can perform the photographing within a range (longitudinally 60° and laterally 120° in visual field angle, i.e., 320×240×6 pixels; called as full frame hereinafter) shown in FIG. 3.

The image data of one full frame is composed of the data of plural frames, and the one full frame is composed of the six frames in the present embodiment. However, the present invention is not limited to such the case, i.e., the one frame may be composed of the appropriate number of frames.

In the present embodiment, in an entire photographable range (one full frame), e.g., the camera performs the photographing in the order indicated by arrows in FIG. 3. In the full frame of FIG. 3, it is assumed that the upper left frame is called as the frame 0, and the following frames clockwise arranged are called as the frames 0, 2, 4, 5, 3 and 1 respectively.

Further, it is assumed in the present embodiment that a time necessary for shifting or moving the photographing range of the camera from one frame to the other frame is ⅙ sec. Thus, the time necessary for photographing the full frame in the present embodiment is one sec.

Hereinafter, a method for recording the image data of each frame will be explained.

The image data has a one-byte (256 colors) data length on one pixel, and is temporarily stored in the temporary storage apparatus 03 as four-dimensional arrangement data DATA [full-frame number (time), frame number, pixel column number, pixel row number]. Therefore, the stored image data can be referred by inversely counting the full-frame number, the frame number, the pixel column number and the pixel row number.

The reception terminal designates the request image range as three-dimensional arrangement data C_REQ[frame number F, pixel column number X, pixel row number Y]. It is assumed that a data length of the C_REQ is three bytes, and the pixel column number and the pixel row number represent an upper left coordinate of the request image range in the present embodiment. However, the present invention is not limited to such a case.

The image data stored in the temporary storage apparatus 03 is reconfigured into the request range of the reception terminal in accordance with the request from such the reception terminal, and then stored in an image data buffer in the image reconfiguration mechanism 04 as three-dimensional arrangement data BUF[reception terminal number N, pixel column number X, pixel row number Y].

Figure 4:
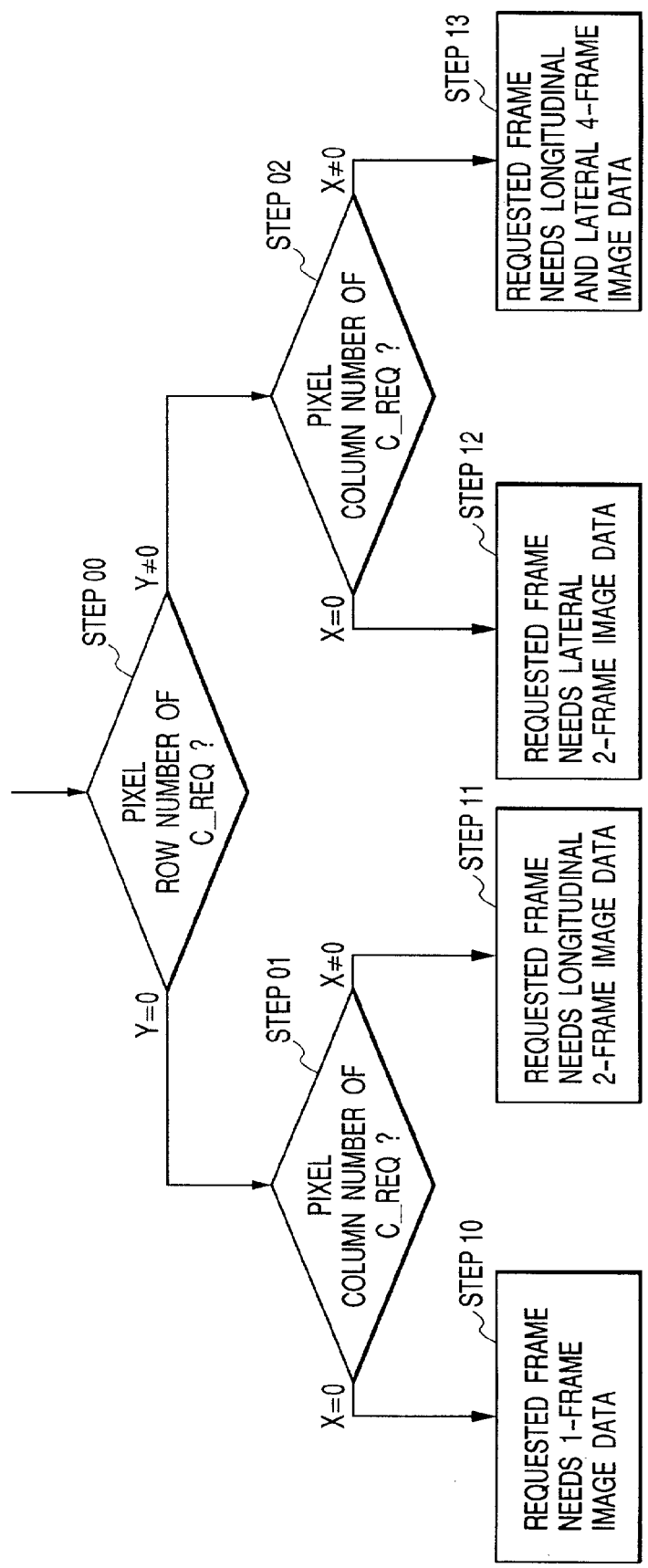
FIG. 4 is a flow chart showing operation when frames are reconfigured on the basis of instructions of the range to be delivered.

Hereinafter, a reconfiguration procedure of the image data according to the image range requested from the reception terminal will be explained in detail with reference to FIG. 4.

It is assumed that the image range requested from the reception terminal N is being designated by the above three-dimensional arrangement data C_REQ[F,X,Y]. The reconfigured image data is stored in the image data buffer as the three-dimensional arrangement data BUF[N,X,Y].

In a step STEP00, the pixel row number of the data C_REQ of the image of the range requested by the reception terminal is checked. In this step, if Y=0, the flow advances to a step STEP01. On the other hand, if Y≠0, the flow advances to a step STEP02.

In the step STEP01, if the pixel row number of the data C_REQ is "0" (Y=0), the pixel column number of the data C_REQ is checked. If the pixel column number of the data C_REQ is "0" (X=0), it is judged that the image of the requested range is composed of only the one frame, and the flow advances to a step STEP10.

If the pixel column number is not "0" (X≠0), it is judged that the image of the requested range is composed of the lateral two frames, and the flow advances to a step STEP11.

On the other hand, in the step STEP02, the pixel column number of the data C_REQ is checked. If the pixel column number of the data C_REQ is "0" (X=0), it is judged that the image of the requested range is composed of the longitudinal two frames, and the flow advances to a step STEP12. If the pixel column number of the data C_REQ is not "0" (X≠0), it is judged that the image of the requested range is composed of the longitudinal and lateral four frames, and the flow advances to a step STEP13.

In the step STEP10, since the image of the requested range is composed of the one frame, all the image data of the frame numbers corresponding to the frame numbers of the data C_REQ are transferred to the image buffer.

In the step STEP11, since the image of the requested range is composed of the lateral two frames, the image data of a rectangular area which is surrounded by the pixels corresponding to data DATA[F,X,0], DATA[F,319,0], DATA[F,X,239], DATA[F,319,239] and DATA[F+2,0,0], DATA[F+2,X−1,0], DATA[F+2,0,239], DATA[F+2,X−1,239] is transferred and stored in the image data buffer such that these data are respectively corresponding to rectangular areas BUF[0,0,0], BUF[0,319−X,0], BUF[0,0,239], BUF[0,319−X,239] and BUF[0,320−X,0], BUF[0,319,0], BUF[0,320−X,239], BUF[0,319,239].

In the step STEP12, since the image of the requested range is composed of the longitudinal two frames, the rectangular image data which is surrounded by the data DATA[F,0,Y], DATA[F,319,Y], DATA[F,0,239], DATA[F,319,239] and DATA[F+1,0,0], DATA[F+1,319,0], DATA[F+1,0,Y−1], DATA[F+1,319,Y−1] is transferred and stored in the image data buffer such that these data are respectively corresponding to the rectangular areas {BUF[0,0,0], BUF[0,319,0], BUF[0,0,239−Y], BUF[0,319,239−Y]} and {BUF[0,0,240−Y], BUF[0,0,240−Y], BUF[0,319,239], BUF[0,319,239]}.

In the step STEP13, since the image of the requested range is composed of the longitudinal and lateral four frames, the rectangular image data which is surrounded by the data {DATA[F,X,Y], DATA[F,319,Y], DATA[F,X,239], DATA[F,319,239]}, {DATA[F+1,X,0], DATA[F+1,319,0], DATA[F+1,X,Y−1], DATA[F+1,319,Y−1]}, {DATA[F+2,0,Y], DATA[F+2,X−1,Y], DATA[F+2,0,239], DATA[F+2,X−1,239]} and {DATA[F+3,0,0], DATA[F+3,X−1,0], DATA[F+3,0,Y−1], DATA[F+3,X−1,Y−1]} is transferred and stored in the image data buffer such that these data are respectively corresponding to the rectangular areas {BUF[0,0,0], BUF[0,319−X,0], BUF[0,0,239−Y], BUF[0,319−X,239−Y]}, {BUF[0,0,240−Y], BUF[0,319−X,240−Y], BUF[0,0,239], BUF[0,319−X,239]}, {BUF[0,320−X,0], BUF[0,319,0], BUF[0,320−X,239−Y], BUF[0,319,239−Y]} and {BUF[0,320−X,240−Y], BUF[0,319,240−Y], BUF[0,320−X,239], BUF[0,319,239]}.

Each image data of the rectangular area which was stored (i.e., reconfigured) in the image data buffer in the steps STEP10 to STEP13 is corresponded to the image range C_REQ[F,X,Y] requested by each reception terminal and then transmitted to such the reception terminal by the image delivery mechanism 05.

Hereinafter, it will be explained with reference to FIGS. 5 and 6 a concrete example in which the requested photographing ranges are reconfigured for the plural reception terminals.

Figure 5:
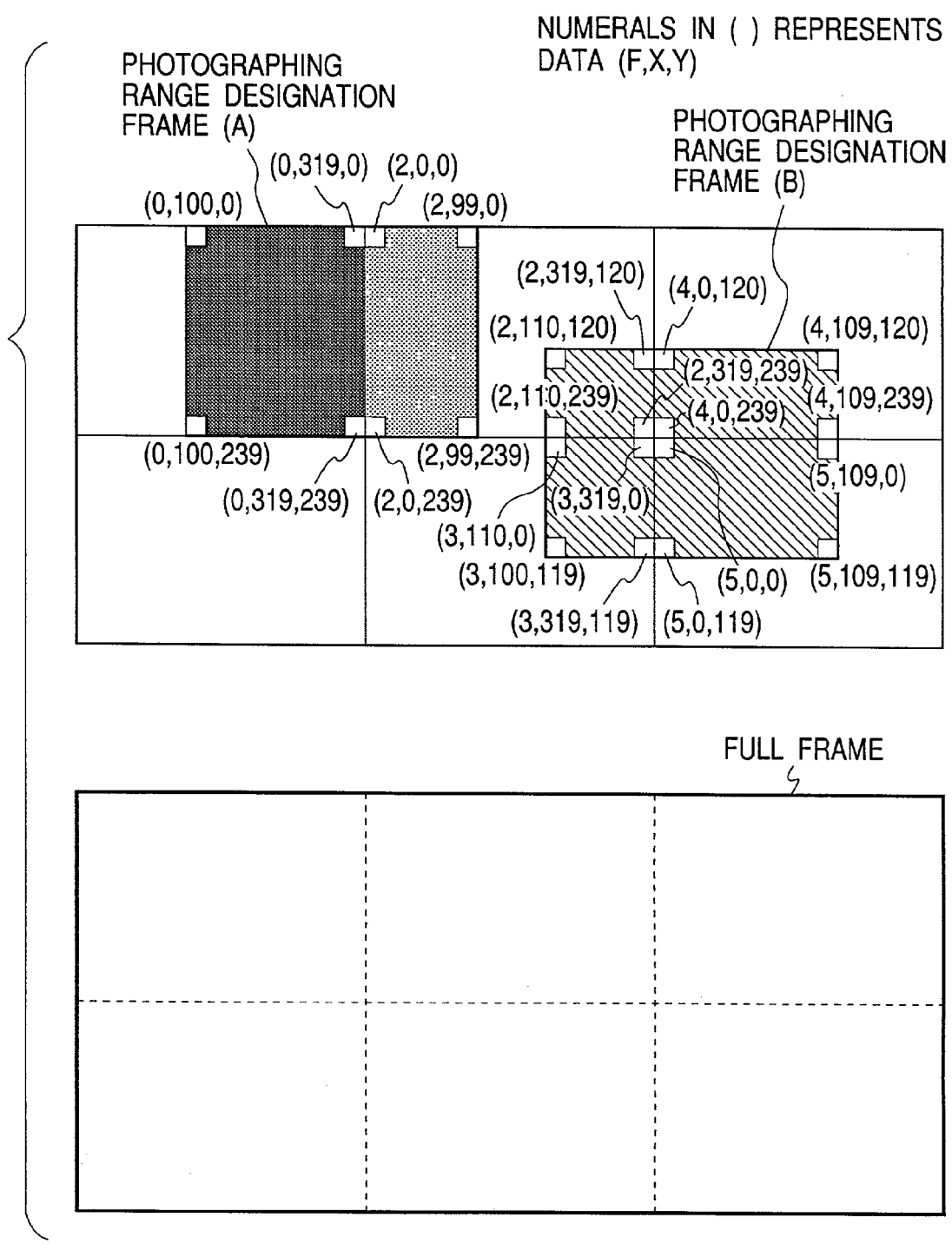
FIG. 5 is a view showing the ranges to be delivered which ranges are requested by reception terminals 09 and 10.
Figure 6:
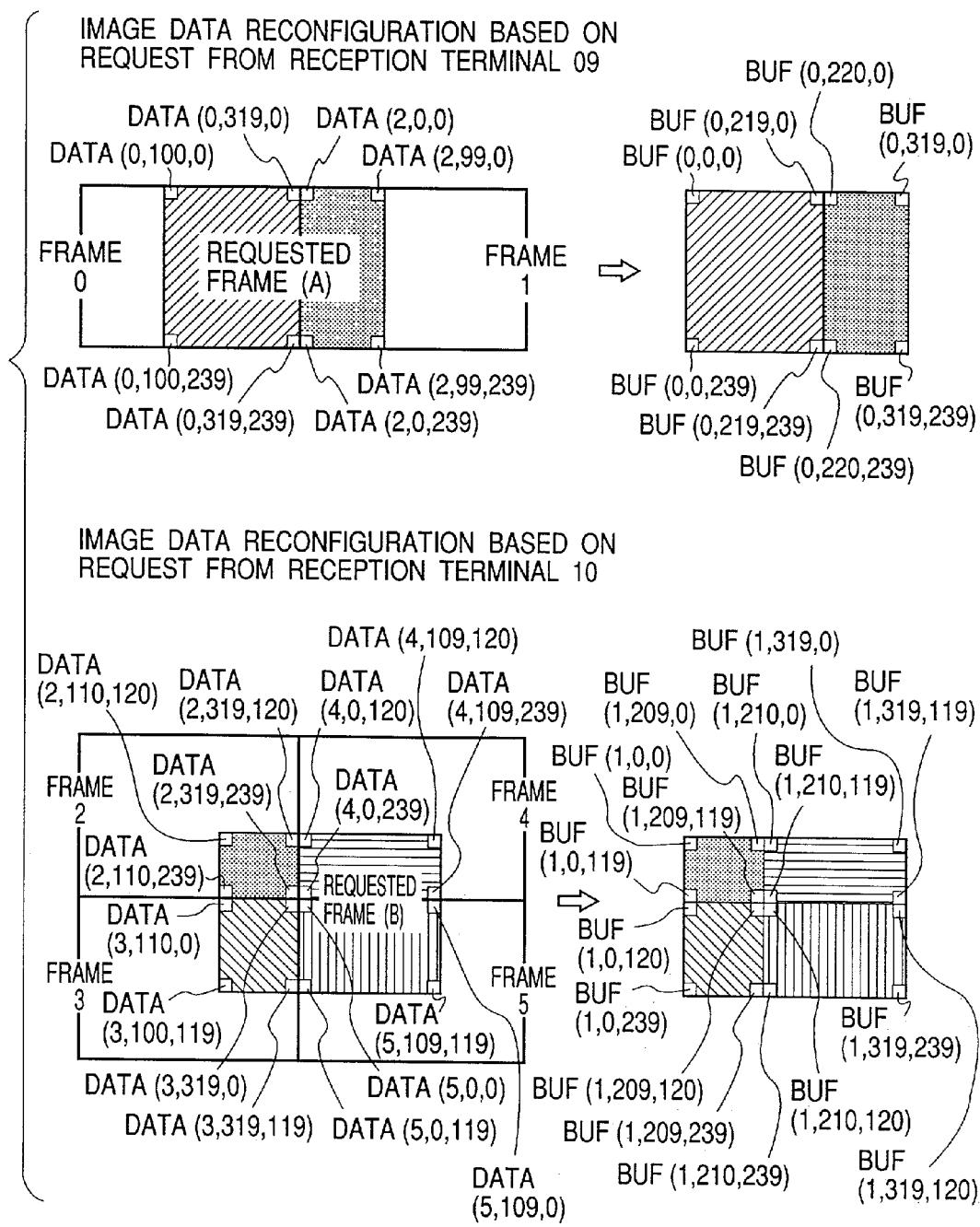
FIG. 6 is a view showing correspondence between the ranges to be delivered requested by the reception terminals 09 and 10 and image data which is reconfigured and delivered.

In this example, a reception terminal 0 (reception terminal number 0) requests an image C_REQ(A)[0,100,0] of a range (A) shown in FIG. 5 by using its internal designation means, and a reception terminal 1 (reception terminal number 1) similarly requests an image C_REQ(B)[2,110,120] of a range (B) shown in FIG. 5.

The camera photographs the full frame corresponding to the full frame number (time) 0, in the order of the frames 0, 2, 4, 5, 3 and 1, and then the obtained image data is temporarily stored or recorded in the temporary storage apparatus 03. The stored image data can be referred as four-dimensional arrangement data (full frame number mod10, frame number, pixel column number, pixel row number). In this case, "mod" represents surplus calculation or residue calculation. However, in the present embodiment, since a capacity of the temporary storage apparatus 03 is assumed to be limited, i.e., the apparatus 03 merely has the capacity capable of storing only ten full frames, when the full frame number (time) exceeds "ten", the stored image data is sequentially overwritten.

The reconfiguration mechanism 04 receives the image range C_REQ[F,X,Y] requested from the reception terminals A 09 and B 10, reconfigures the request frame (i.e., image data of rectangular area reconfigured in STEP10 to STEP13) from the image data stored in the temporary storage apparatus 03 in accordance with the requested image range, stores the request frame in the image data buffer, and then delivers the stored frame to each reception terminal.

The image range is calculated as follows. In this case, it is assumed that the photographing range requested from each reception terminal has been already corrected not to exceed the full frame.

In the step STEP00, the pixel row number is checked from the image C_REQ(A)[0,100,0] of the range (A) requested from the reception terminal 0. In this step, since the obtained pixel row number is "0", the flow advances to the step STEP01.

Then, in the step STEP01, the pixel column number is checked. In this step, since the obtained pixel column number is "100", it is judged that the image of the requested range is composed of the lateral two frames, and the flow advances to the step STEP11.

In the step STEP11, since the image of the requested range is composed of the lateral two frames, the rectangular image data which is surrounded by the data DATA[0,100,0], DATA[0,319,0], DATA[0,100,239], DATA[0,319,239] and DATA[2,0,0], DATA[2,99,0], DATA[2,0,239], DATA[2,99,239] is transferred and stored in the image data buffer, such that these data are respectively corresponding to the rectangular areas BUF[0,0,0], BUF[0,219,0], BUF[0,0,239], BUF[0,219,239] and BUF[0,220,0], BUF[0,319,0], BUF[0,0,239], BUF[0,319,239].

On the other hand, in the step STEP00, the pixel row number is checked from the image C_REQ(B)[2,110,120] of the range (B) requested from the reception terminal 1. In this step, since the obtained pixel row number is "110", the flow advances to the step STEP02.

Then, in the step STEP02, the pixel column number is checked. In this step, since the obtained pixel column number is "120", it is judged that the image of the requested range is composed of the longitudinal and lateral four frames, and the flow advances to the step STEP13.

In the step STEP13, since the image of the requested range is composed of the longitudinal and lateral four frames, the rectangular image data which is surrounded by the data {DATA[2,110,120], DATA[2,319,120], DATA[2,110,239], DATA[2,319,239]}, {DATA[3,110,0], DATA[3,319,0], DATA[3,110,119], DATA[3,319,119]}, {DATA[4,0,120], DATA[4,109,120], DATA[4,0,239], DATA[4,109,239]} and {DATA[5,0,0], DATA[5,109,0], DATA[5,0,119], DATA[5,109,119]} is transferred and stored in the image data buffer such that these data are respectively corresponding to the rectangular areas {BUF[1,0,0], BUF[1,209,0], BUF[1,0,119], BUF[1,209,119]}, {BUF[1,0,120], BUF[1,109,120], BUF[1,0,239], BUF[1,109,239]}, {BUF[1,210,0], BUF[1,319,0], BUF[1,210,119], BUF[1,319,119]} and {BUF[1,210,120], BUF[1,319,120], BUF[1,210,239], BUF[1,319,239]}.

By such the manner as described above, the part of the full-frame image data is reconfigured, the reconfigured image data is transferred and stored in the image data buffer, the stored image data is transmitted to each reception terminal through the communication network 08, and the received image data is displayed at each reception terminal.

Since the above-explained operation is repeated every time the full frame number (time) is updated, each reception terminal can always display the moving image of the desired area in each full frame of the moving image which was photographed or taken by the camera 01.

Therefore, each reception terminal can feign to designate the photographing area of the camera 01, and can display the designated area.

According to the present embodiment, when the image data which represents the image according to the request range of each reception terminal is transmitted from the wide-range image to each reception terminal, even if the reception terminals increase, the image data of the photographing range requested by each reception terminal can be transmitted to such the reception terminal. Moreover, the image data can be transmitted to each reception terminal with simple structure.

Second Embodiment

Figure 7:
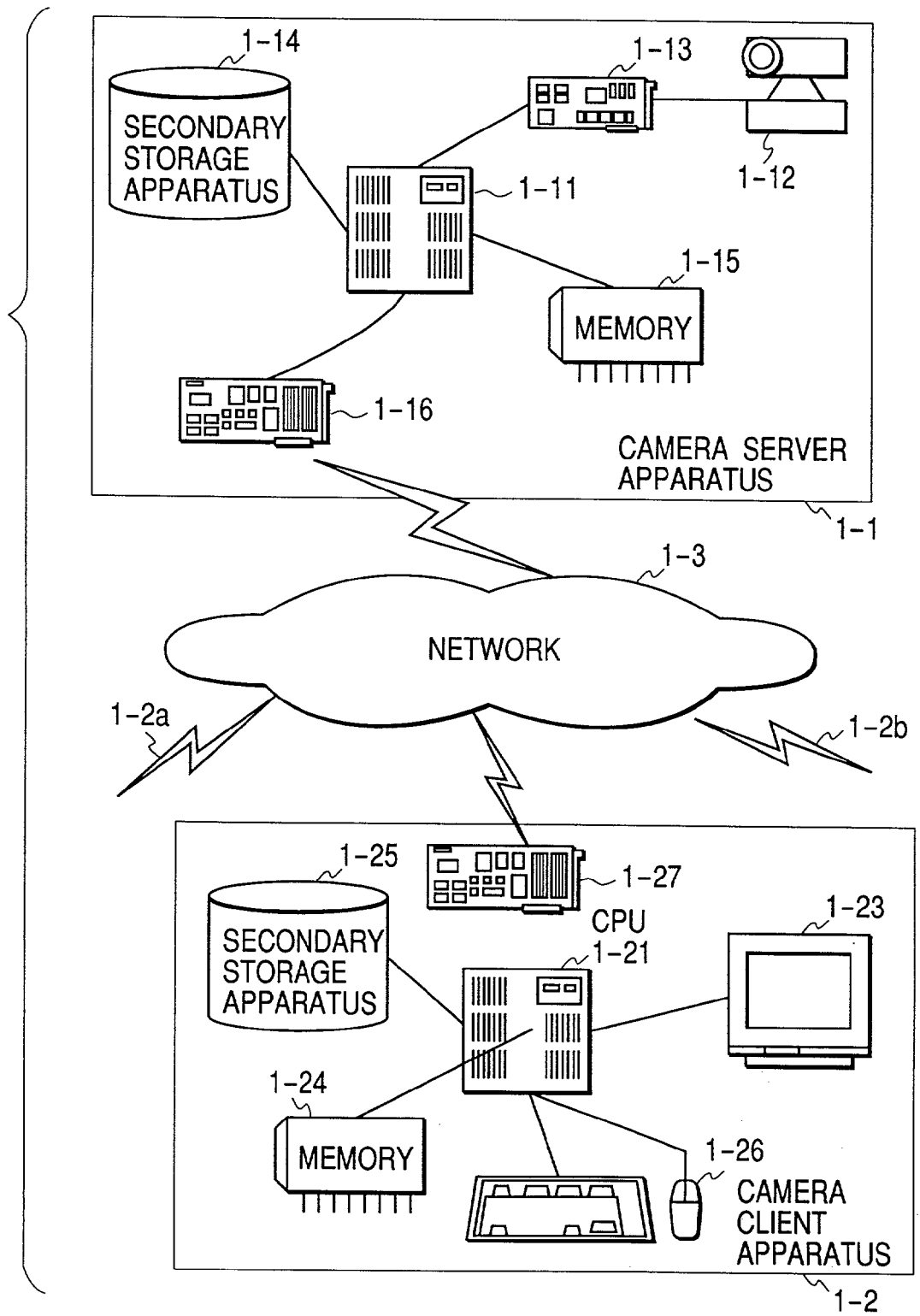
FIG. 7 is a view showing an entire communication system.

FIG. 7 is an entire block diagram showing the second embodiment of the present invention which will be explained hereinafter.

A system shown in FIG. 7 is composed of a camera server apparatus 1-1 and a camera client apparatus 1-2. The camera server apparatus 1-1 captures or obtains an image photographed or taken by a video camera 1-12, and then delivers the captured image to the client apparatus being connected at this time. The camera client apparatus 1-2 which is one of apparatuses being currently connected to the camera server apparatus 1-1 through a network receives the image sent from the camera server apparatus 1-1, and displays the received image on a bit map display 1-23. In the present embodiment, although it is assumed that the camera client apparatus 1-2 and other camera client apparatuses 1-2a, 1-2b and the like which have the same function as that of the apparatus 1-2 are connected to the one camera server apparatus 1-1, only the camera client apparatus 1-2 is explained in detail.

The camera server apparatus 1-1 is composed of the video camera 1-12 which inputs the image as a digital signal, a video capture apparatus 1-13 which captures the image from the video camera 1-12, a network interface 1-16 which transmits the captured image to a network 1-3, a CPU 1-11 and a memory 1-15 which together control the operation of the camera server apparatus 1-1 as a whole, and a secondary storage apparatus 1-14 which stores access information.

The video capture apparatus 1-13 captures an NTSC signal of the photographed image from the video camera 1-12, and performs A/D converting on the captured signal. After then, the apparatus 1-13 compresses the converted signal in a motion JPEG (joint photographic expert group) system, and sends the compressed signal to the network interface 1-16. In the present embodiment, the motion JPEG system is applied as the compression system of the image. However, the present invention is not limited to such the system, but may apply a loss-less compression system. As to a frame rate of the image, it is assumed that the image is captured and delivered within a range which is allowed by rates of the network, the CPU and the like and a capture rate of the camera.

The camera client apparatus 1-2 receives the image data (signal) transmitted from the camera server apparatus 1-1 through the network 1-3, by means of a network interface 1-27. In the apparatus 1-2, the compressed image data is expanded by a CPU 1-21 and displayed on the bit map display 1-23.

In the camera client apparatus 1-2, it is assumed that e.g., an operation system of window type operates and can be displayed on the display 1-23. The camera client apparatus 1-2 has a memory 1-24 which assists in the operation of the CPU 1-21, a secondary storage apparatus 1-25 which stores the image data, and an input apparatus 1-26 such as a mouse or a keyboard which inputs a control command of the camera.

Figure 9:
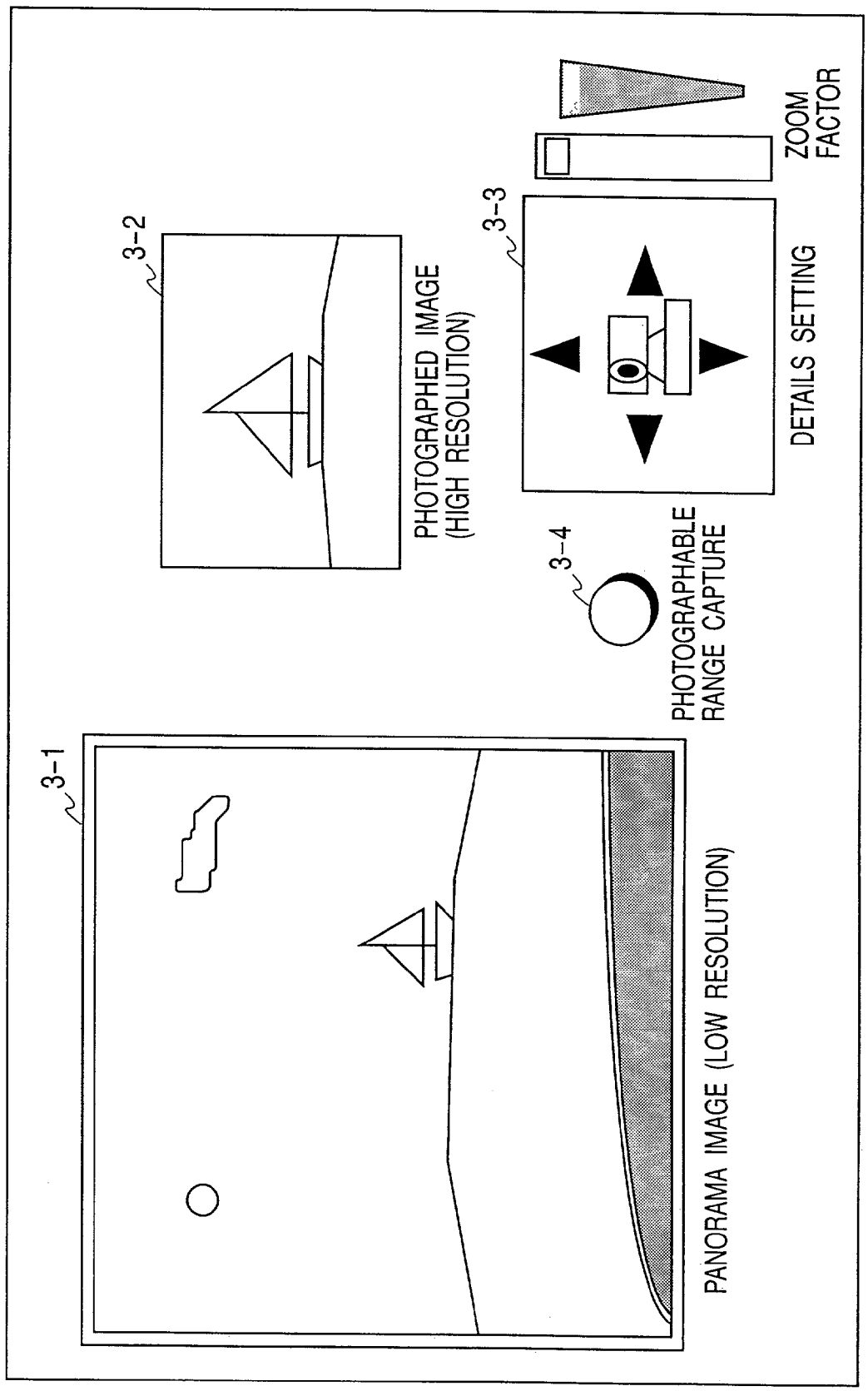
FIG. 9 is a view showing a displayed example of a display of a camera client apparatus.

FIG. 9 is a view showing an operation image plane displayed on the bit map display 1-23. It is assumed that, on the bit map display 1-23, an operation system which can display plural windows operates.

In FIG. 9, reference numeral 3-1 denotes a pseudo panorama window which displays a pseudo panorama image. The pseudo panorama image is displayed on the bit map display 1-23. In this case, the pseudo panorama image is displayed with smaller image size and lower resolution as compared with the size and resolution of the actual image in accordance with display ability of the display 1-23. That is, the image to the extent by which a user can know or grasp conditions is displayed.

Reference numeral 3-2 denotes an image window which real-time displays the image currently photographed by the camera server apparatus 1-1 on the basis of the camera controlling from the camera client apparatus 1-2. Reference numeral 3-3 denotes camera control windows which are used to designate camera control parameters necessary for pan, tilt and zooming operations to perform the camera controlling. Reference numeral 3-4 denotes a button which is used to request the pseudo panorama image. When the user clicks the button 3-4 by the mouse or the like, the process for capturing the pseudo panorama image starts.

Figure 14:
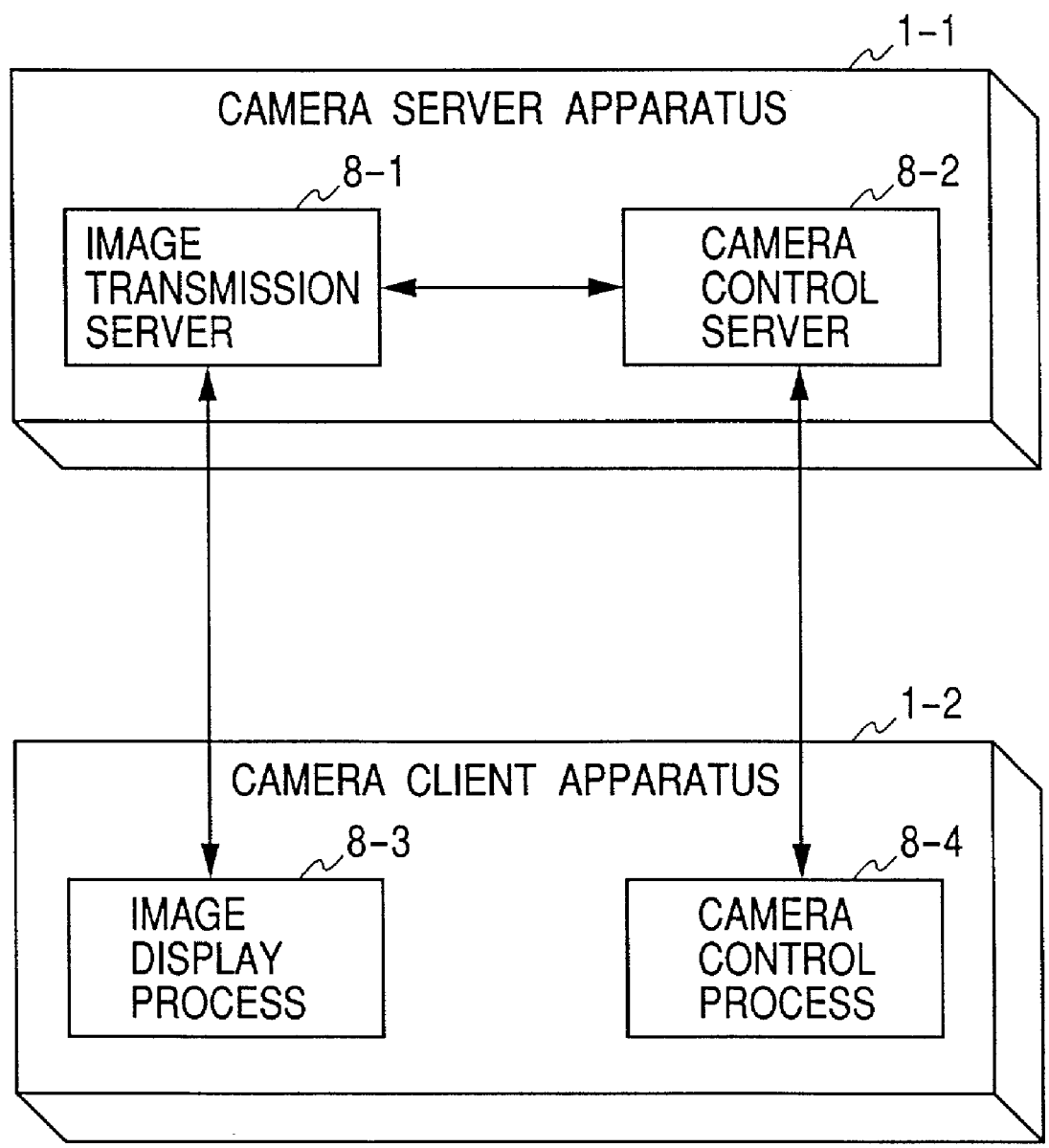
FIG. 14 is a view showing a concept of an entire process of the communication system.

FIG. 14 is a view showing a concept of the entire process in the present embodiment. In this case, the process means the process of a multi-task OS such as a UNIX or the like. In the camera server apparatus 1-1, an image transmission server 8-1 and a camera control server 8-2 operate to convert the image photographed or taken by the video camera 1-12 into the image data of motion JPEG format or the like by using the video capture apparatus 1-13 and then sequentially transmit the converted image data to the camera client apparatus 1-2. In this case, the image data which is transmitted by the image transmission server 8-1 is not limited to the video data (i.e., moving image data or animation data), but may be the still image data of GIF (graphic interchange format), JPEG format or the like.

In the camera client apparatus 1-2, an image display process 8-3 and a camera control process 8-4 operate. The image display process 8-3 sequentially receives the image data or the still image data from the camera server apparatus 1-1 and displays the received data, and the camera control process 8-4 operates the video camera 1-12.

Figure 12:
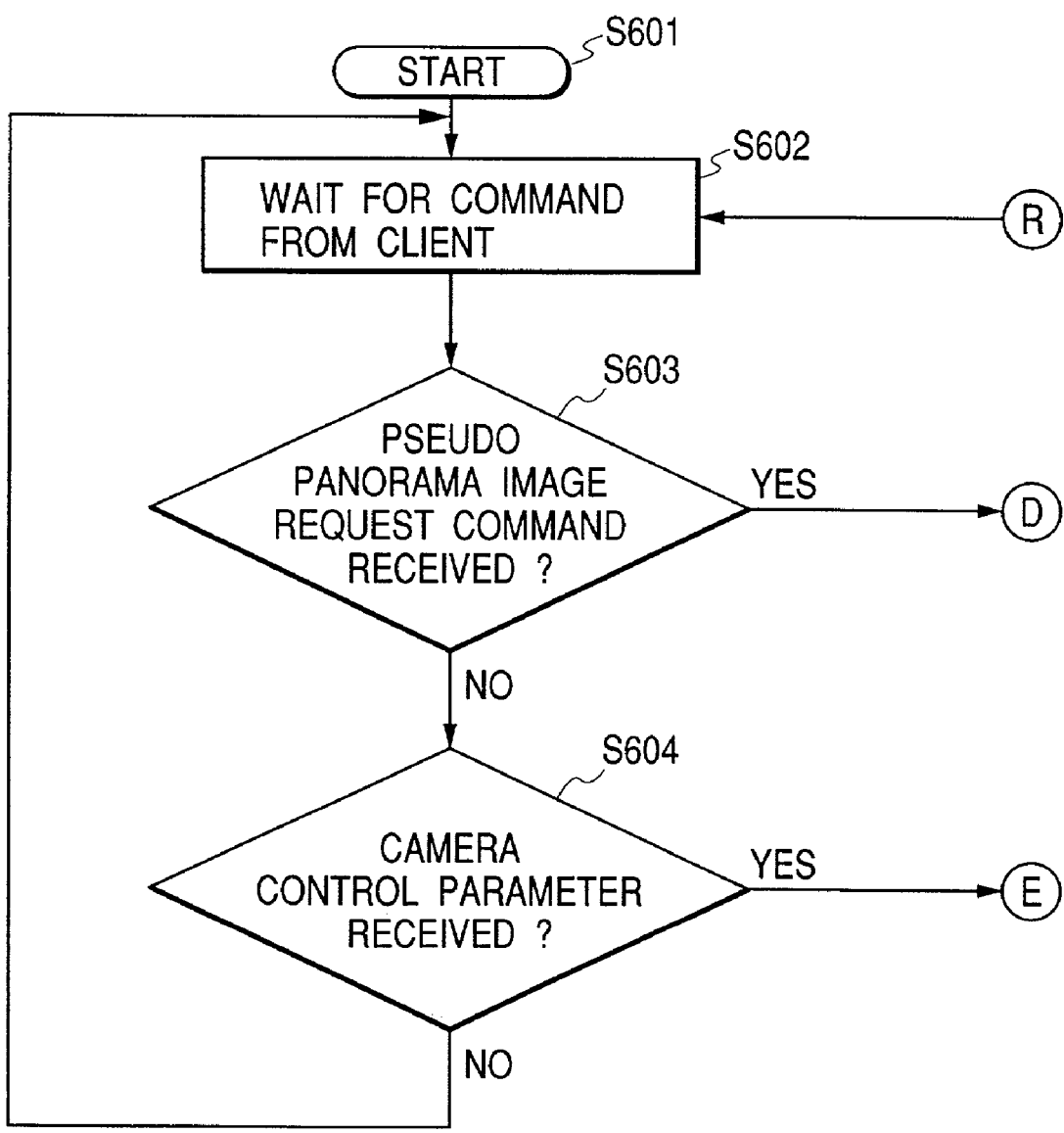
FIG. 12 is a flow chart showing processes of a camera server apparatus.
Figure 13:
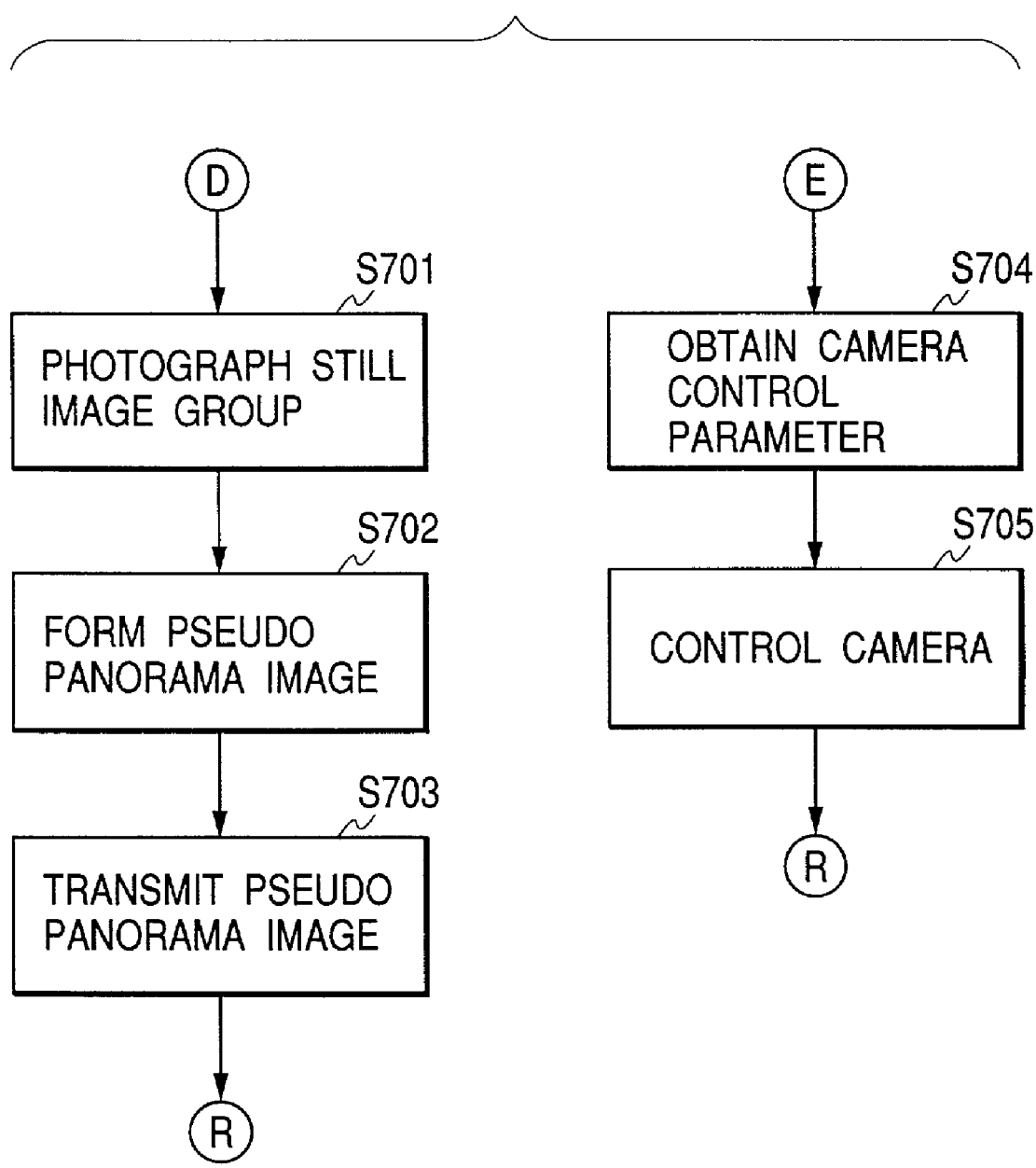
FIG. 13 is a flow chart showing processes of the camera server apparatus.

FIGS. 12 and 13 are flow charts concerning the process of the camera control server 8-2 provided in the camera server apparatus 1-1. Hereinafter, the operation of the camera server apparatus 1-1 will be explained with reference to FIGS. 12 and 13.

Initially, in a step S602, the receiving of the camera control command sent from the camera client apparatus 1-2 is waited. When the camera control command is received, its contents are judged in steps S603 and S604, and the flow advances to process D or E in accordance with the judged result. Then, when the process D or E terminates, the flow again returns to the step S602 to wait the command.

In the step S603, if it is judged that the command from the camera client apparatus 1-2 is to request the pseudo panorama image, the process D, i.e., processes in steps S701 to S703 in FIG. 13 are performed.

That is, in the step S701, in accordance with a photographable range (i.e., movable range) of the video camera 1-12, the pan and tilt angles of the camera 1-12 are varied every predetermined angle, thereby continuously photographing the still image at each pan and tilt angles (i.e., predetermined angle).

Figure 16:
FIG. 16 is a view showing angles of a video camera 1-12 operating when the pseudo panorama image is generated.

At this time, in order to photograph a wide range as much as possible, zooming magnification is set to be a minimum value. For example, if a tile controllable range of the camera is a range of −20° to 20° and a pan controllable range is a range of −50° to 50°, the universal head of the video camera 1-12 is controlled to have such the pan and tilt angles as shown in FIG. 16, and the still image is photographed at each camera control position.

Positional information representing the pan and tilt angles at this image photographing time is later used when the pseudo panorama image is formed, and thus temporarily stored in the memory or the like.

Figure 8:
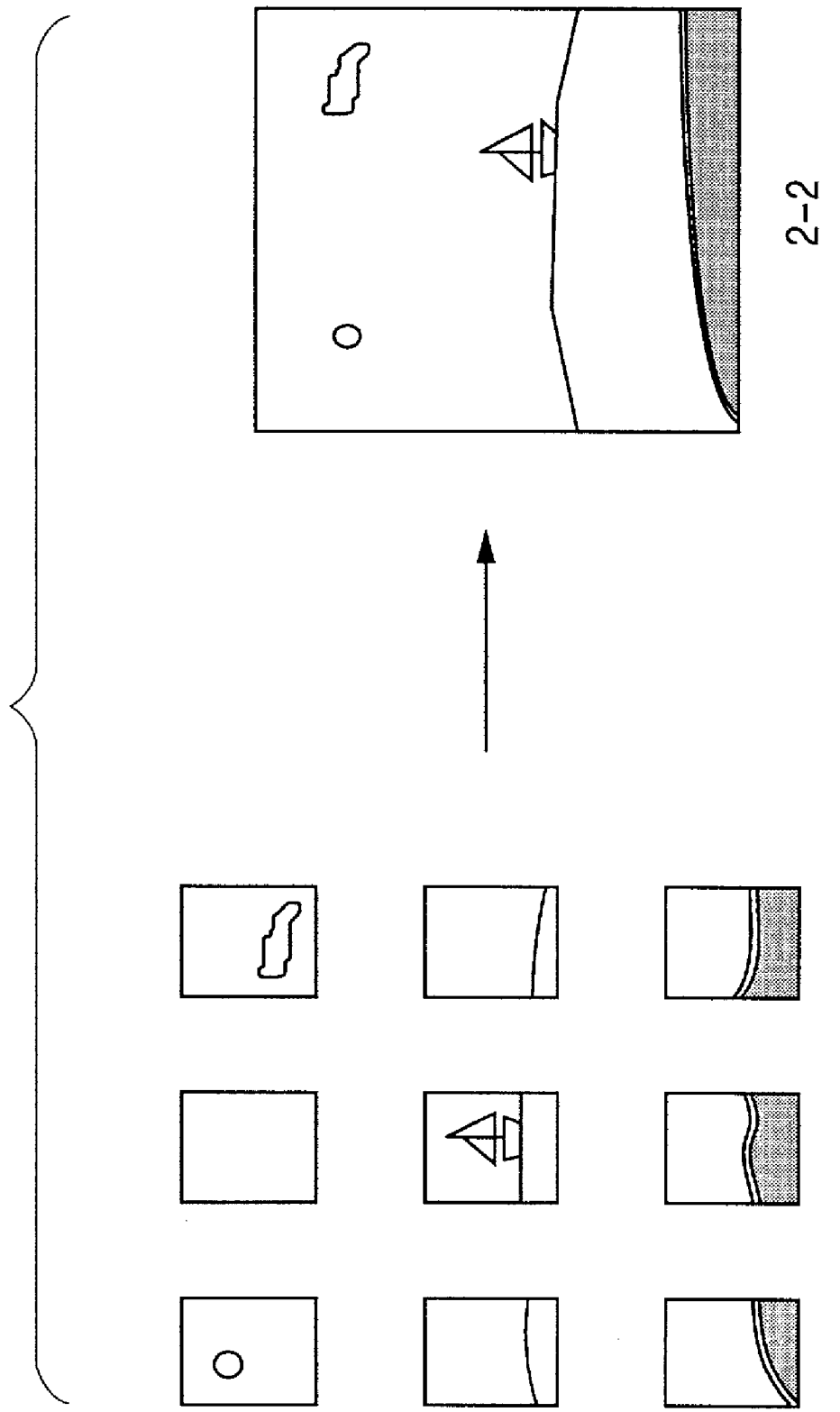
FIG. 8 is a view for explaining a method for generating a pseudo panorama image.

Subsequently, in the step S702, as shown in FIG. 8, the camera server apparatus 1-1 joins together plural still images 2-1 obtained in the process of the step S701, on the basis of the positional information stored in the memory or the like, to form a pseudo panorama image 2-2.

Then, in the step S703, the camera server apparatus 1-1 transmits the pseudo panorama image 2-2 to the camera client apparatus 1-2 through the network, and then the flow again returns to the step S602 in FIG. 12 to wait the command.

When the camera server apparatus 1-1 receives the camera control parameter in the step S604 in FIG. 12, the flow advances to the process E, i.e., a step S704 in FIG. 13. In the step S704, the camera control parameters such as the pan and tilt angles, the zooming magnification and the like are obtained from the camera client apparatus 1-2. Then, in a step S705, after the operation of the video camera 1-12 is controlled according to these camera control parameters, the flow again returns to the step S602 in FIG. 12 to wait the command.

Figure 10:
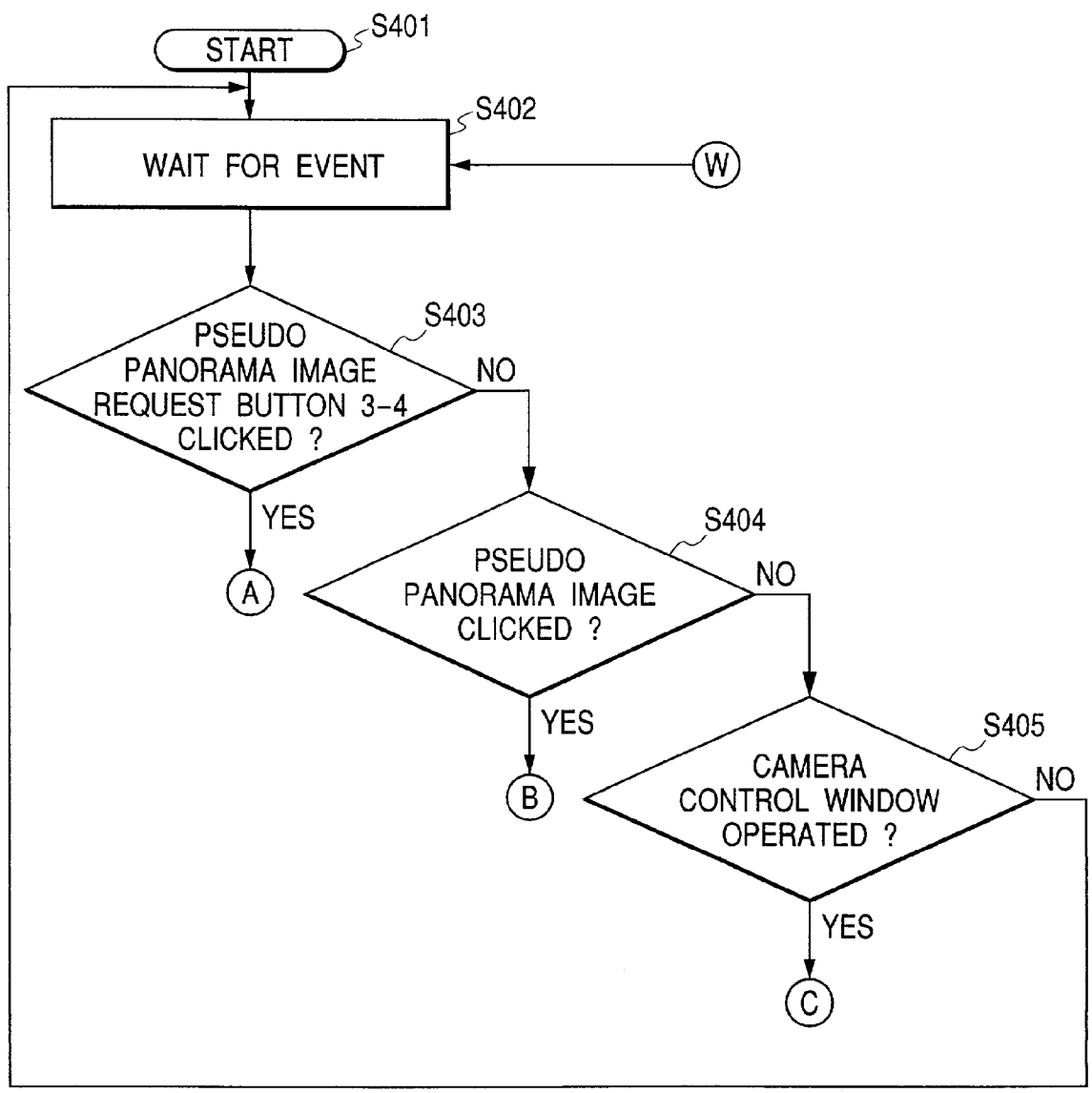
FIG. 10 is a flow chart showing processes of the camera client apparatus.
Figure 11:
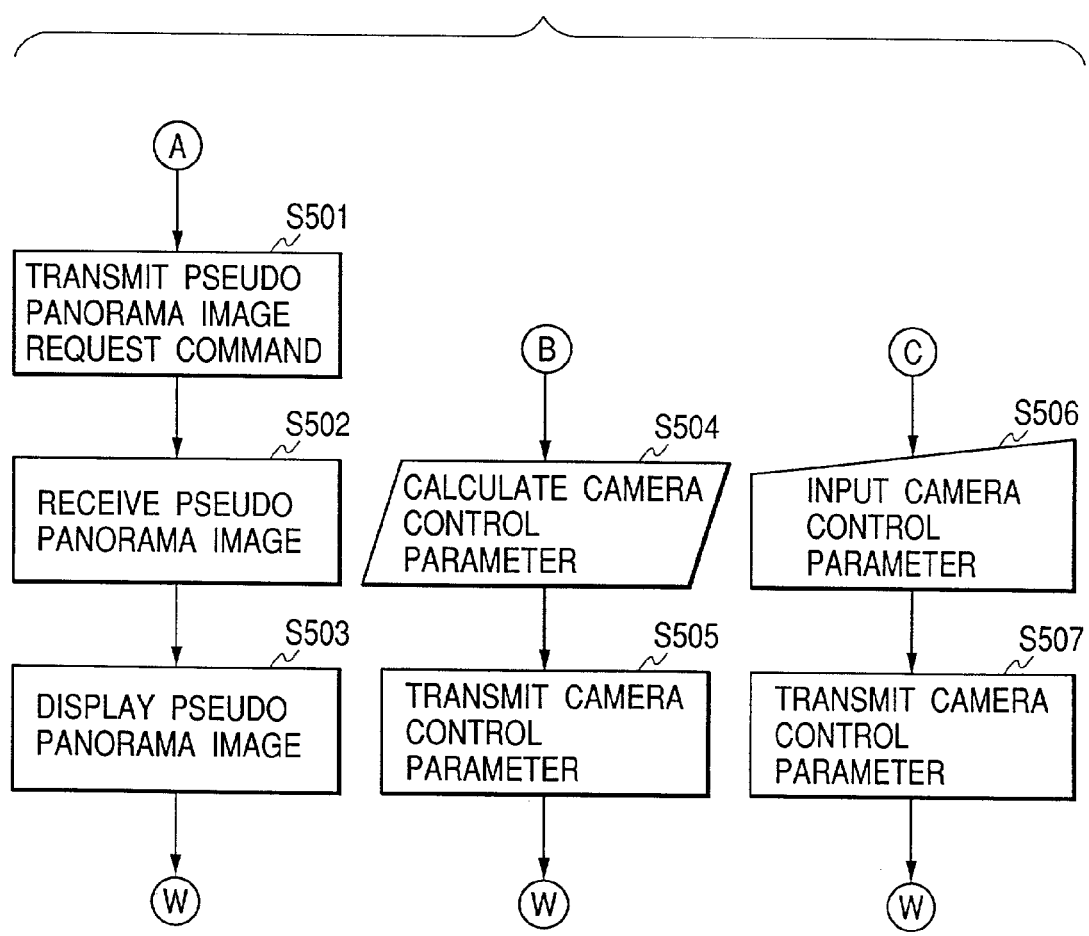
FIG. 11 is a flow chart showing processes of the camera client apparatus.

FIGS. 10 and 11 are flow charts concerning the process of the camera control process 8-4 in the camera client apparatus 1-2. Hereinafter, the operation of the camera client apparatus 1-2 will be explained with reference to FIGS. 10 and 11.

In a step S402, a user's instruction by mouse operation or the like is waited. When the instruction is sent from the user, the flow advances to a step S403. In the step S403, if the user clicks the pseudo panorama image request button 3-4, the flow advances to a process A, i.e., steps S501 to S503 shown in FIG. 11. If not, the flow advances to a step S404 and following steps.

When the flow advances to the process A in FIG. 11, initially in the step S501 the command for requesting the pseudo panorama image is generated and transmitted to the camera server apparatus 1-1. Then, in the step S502, the pseudo panorama image data is received from the camera server apparatus 1-1. In the step S503, after the pseudo panorama image is displayed on the bit map display 1-23, the flow returns to an event wait state in the step S402.

Subsequently, in the step S404, if the user clicks the pseudo panorama image window 3-1, the flow advances to a process B, i.e., steps S504 and S505 in FIG. 11. If not, the flow advances to a step S405.

When the flow advances to the process B in FIG. 11, initially in the step S504 the pan and tilt angles corresponding to the coordinates on the clicked pseudo panorama image are calculated and generated as the camera control parameters. Then, in the step S505, after the generated camera control parameters are transmitted to the camera server apparatus 1-1, the flow returns to the event wait state in the step S402.

Subsequently, in the step S405, if the user operates the camera control window 3-3, the flow advances to a process C, i.e., steps S506 and S507 in FIG. 11. If not, the flow returns to the event wait state in the step S402.

When the flow advances to the process C in FIG. 11, initially in the step S506 the pan and tilt angles corresponding to a control panel of the camera control window operated by the user are calculated and generated as the camera control parameters. Then, in the step S507, after the calculated camera control parameters are transmitted to the camera server apparatus 1-1, the flow returns to the event wait state in the step S402.

When the above-described processes are performed by the camera server apparatus 1-1 and the camera client apparatus 1-2, the user who operates the camera client apparatus 1-2 can update the pseudo panorama image 3-1 to a newest state every time he clicks the button 3-4 for requesting the pseudo panorama image by using the mouse or the like.

Further, by only selecting and clicking a part of the pseudo panorama image 3-1, the camera control parameters for obtaining the image of such the part can be automatically generated and transmitted to the camera server apparatus 1-1. Furthermore, the detailed pan and tilt angles and the zooming magnification can be set through the control panel of the camera control window 3-3.

Since the pseudo panorama image 2-2 is represented by the still image signal, such the signal can be transmitted at high speed as compared with the case of continuously transmitting the moving image signal through the network, and the processing time necessary for displaying this pseudo panorama image 2-2 on the camera client apparatus 1-2 can be shortened. For these reasons, the user who operates the camera client apparatus 1-2 can quickly grasp or know the photographable range of the video camera 1-12 if necessary. Therefore, by operating the pseudo panorama image window 3-1 and the camera control window 3-3, the user can quickly and easily control the video camera at the desired angle and in the desired magnification.

Third Embodiment

In the above-described second embodiment, the camera server apparatus 1-1 joins together the plural still image groups which were photographed by the video camera 1-12 to synthesize the pseudo panorama image. However, the plural still image groups and the camera control parameters at the photographing time may be transmitted to the camera client apparatus as there are, such that the camera client side synthesizes the pseudo panorama image.

Concretely, in the camera control server process of the camera client apparatus, the process in the step S702 of FIG. 13 is not performed. That is, the process in the step S702 is replaced by the transmission process of the still image group and the positional information of each still image. Further, in the camera control process of the camera client apparatus, the process in the step S502 is replaced by the reception process of the still image group, and a step of forming the pseudo panorama image same as in the step S702 is added before the flow advances to the step S503. By such replacement, the load in the information process on the camera server apparatus 1-1 side can be reduced.

Fourth Embodiment

Figure 15:
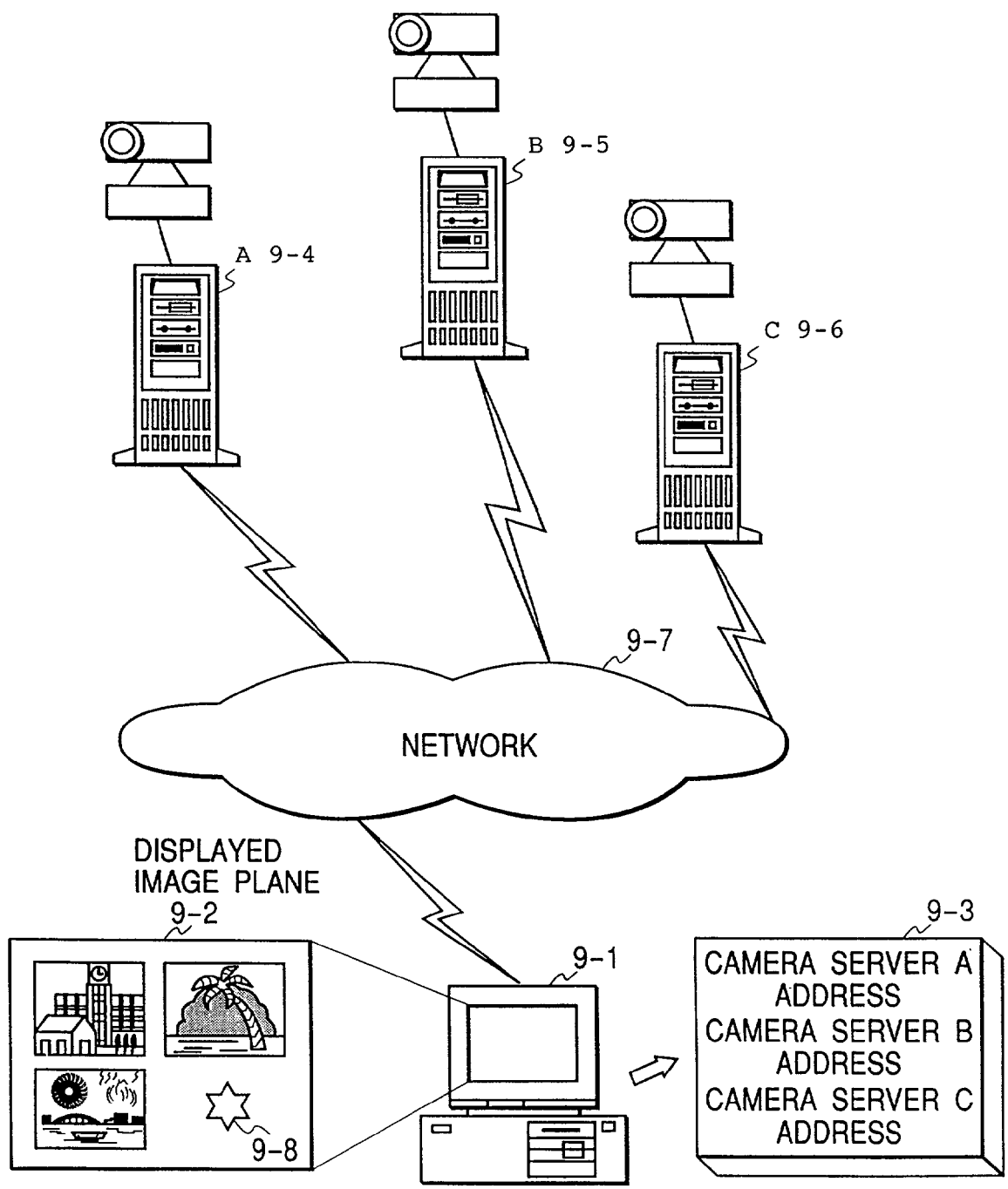
FIG. 15 is a view showing the communication system according to a fourth embodiment.

FIG. 15 is a block diagram for explaining the fourth embodiment of the present invention. In the present embodiment, it is assumed that the hardware structures of a camera client apparatus 9-1, a camera server apparatus A 9-4, a camera server apparatus B 9-5 and a camera server apparatus C 9-6 are substantially the same as those in the second embodiment shown in FIG. 7. When a user of the camera client apparatus 9-1 has already known network addresses of the plural camera server apparatuses, some of these addresses (e.g., camera server apparatuses A 9-4, B 9-5 and C 9-6) have been previously registered in a camera server list 9-3.

Such the camera server list 9-3 has been previously stored in a memory or a secondary storage apparatus of the camera client apparatus 9-1. When the user clicks a button (e.g., button 9-8) for requesting a pseudo panorama image to the plural camera servers apparatuses displayed on a bit map display 9-2, the camera client apparatus 9-1 requests the pseudo panorama image to each of the plural camera server apparatuses A 9-4, B 9-5 and C 9-6 described in the camera server list 9-3. Then, the camera client apparatus 9-1 receives the pseudo panorama image data from each camera server apparatus in the above-described method, and displays the received data on the bit map display 9-2.

When the plural pseudo panorama image are simultaneously displayed on the bit map display 9-2, each pseudo panorama image can be displayed with smaller size and lower resolution as compared with the size and resolution of the actual image, in accordance with display ability of the display 9-2. In other words, the pseudo panorama image to the extent by which the user can recognize can be displayed on the bit map display 9-2.

As described above, since the camera client apparatus has the function for requesting the pseudo panorama image to the plural camera server apparatuses, the user can grasp or know photographing (i.e., photographable) ranges of the camera server apparatuses at plural location in a short time.

It is obviously understood that various storage media such as a CD (compact disk), an FD (floppy disk) and the like for storing in a computer readable state program codes to operate various devices so as to realize the functions of the above-described embodiments are included in the scope of the present invention.

According to the above-described second to fourth embodiments of the present invention, since the user can quickly and easily know the photographable range of the image input apparatus such as the video camera or the like, he can quickly recognize or find the desired camera position.

Although the present invention has been described above with respect to the preferred embodiments, the present invention is not limited to these embodiments but many modification and variations are possible within the spirit and scope of the appended claims.

What is claimed is:

1. An image processing apparatus which can be connected to plural terminals, comprising:
   a storage device arranged to store image data of an object, wherein the image data includes a plurality of frames corresponding to a plurality of partial areas of the object and the frames are generated by a single camera device that photographs the plurality of partial areas of the object separately;
   a reception device arranged to receive a command from a terminal, wherein the command designates an area to be transmitted, included in the entire area of the object;
   a selection device arranged to select automatically a plurality of frames which include image data of a portion corresponding to the designated area on the basis of the coordinate of the designated area;
   a reconfiguration device arranged to reconfigure the image data of the designated area on a buffer by using the image data of the portion included in the frames selected by said selection device; and
   a transmission device arranged to transmit the image data in the buffer, to the terminal which transmitted the command.

2. An apparatus according to claim 1, wherein said camera device is a camera of which operation can be controlled from said image processing apparatus.

3. An apparatus according to claim 1, wherein each of the frames is processed by causing said single camera device to periodically photograph each of the partial areas.

4. An apparatus according to claim 1, wherein said image processing apparatus is connected to the plural terminals through a communication line.

5. An apparatus according to claim 1, wherein each of the plural terminal displays on its display unit the image data transmitted from said transmission device, by using a browser software.

6. A control method of an image processing apparatus which can be connected to plural terminals, said method comprising:
   a storage step of storing image data of an object, wherein the image data includes a plurality of frames corresponding to a plurality of partial areas of the object and the frames are generated by a single camera device that photographs the plurality of partial areas of the object separately;
   a reception step of receiving a command from a terminal, wherein the command designates an area to be transmitted, included in the entire area of the object;
   a selection step of selecting automatically a plurality of frames which include image data of a portion corresponding to the designated area on the basis of the coordinate of the designated area;
   a reconfiguration step of reconfiguring the image data of the designated area on a buffer by using the image data of the portion included in the frames selected in said selection step; and
   a transmission step of transmitting the image data in the buffer, to the terminal which transmitted the command.

7. A computer readable storage medium which stores in a readable state a computer program of an image processing apparatus which can be connected to plural terminals, said program comprising:
   a storage step of storing image data of an object, wherein the image data includes a plurality of frames corresponding to a plurality of partial areas of the object and the frames are generated by a single camera device that photographs the plurality of partial areas of the object separately;
   a reception step of receiving a command from a terminal, wherein the command designates an area to be transmitted, included in the entire area of the object;
   a selection step of selecting automatically a plurality of frames which include image data of a portion corresponding to the designated area on the basis of the coordinate of the designated area;
   a reconfiguration step of reconfiguring the image data of the designated area on a buffer by using the image data of the portion included in the frames selected in said selection step; and
   a transmission step of transmitting the image data in the buffer, to the terminal which transmitted the command.

8. An image processing apparatus, comprising:
   a storage device arranged to store image data of an object, wherein the image data includes a plurality of frames corresponding to a plurality of partial areas of the object and the frames are generated by a camera device that photographs the plurality of partial areas of the object separately;
   a reception device arranged to receive a designation of an area to be reconfigured, included in the entire area of the object;
   a selection device arranged to select automatically a plurality of frames which include image data of a portion corresponding to the designated area on the basis of the coordinate of the designated area; and
   a reconfiguration device arranged to reconfigure the image data of the designated area on a buffer by using the image data of the portion included in the frames selected by said selection device.

9. An image processing apparatus according to claim 8, wherein said buffer stores only the image data of the area overlapped with the designated area, out of the selected frames.

10. An image processing apparatus according to claim 8, wherein said selection device changes the number of the frames to be selected, in accordance with the coordinate of the designated area.

11. An image processing apparatus according to claim 8, further comprising:
    a reception device arranged to receive a command including the designation from an outer device;
    a transmission device arranged to transmit the composed image data to the outer device, in accordance with the command received by said reception device.

12. An apparatus according to claim 8, further comprising a calculating device arranged to calculate the coordinate of the portion corresponding to the designated area on the basis of the selected frames,
    wherein said reconfiguration device reconfigures the image data of the designated area on a buffer on the basis of the calculation result by said calculating device.

13. An apparatus according to claim 12, said reconfiguration device reconfigures the image data of the designated area by convening the coordinate of the portion to the coordinate of the designated area on the buffer.

14. A method of an image processing, comprising:
    storing image data of an object, wherein the image data includes a plurality of frames corresponding to a plurality of partial areas of the object and the frames are generated by a camera device that photographs the plurality of partial areas of the object separately;

receiving a designation of an area to be reconfigured, included in the entire area of the object;

selecting automatically a plurality of frames which include image data of a portion corresponding to the designated area on the basis of the coordinate of the designated area; and reconfiguring the image data of the designated area on a buffer by using the image data of the portion included in the frames selected by said selecting.

15. The method according to claim 14, wherein said buffering stores only the image data of the area overlapped with the designated area, out of the selected frames.

16. The method according to claim 14, wherein said selecting changes the number of the frames to be selected, in accordance with the coordinate of the designated area.

17. The method according to claim 14, further comprising:

receiving a command including the designation from an outer device;

transmitting the composed image data to the outer device, in accordance with the command received by said receiving.

18. A computer readable medium having stored thereon a computer image processing program comprising a set of instructions when executed by a computer to implement a method of setting a white balance gain value of an imaging device, the method comprising the steps of:

storing image data of an object, wherein the image data includes a plurality of frames corresponding to a plurality of partial areas of the object and the frames are generated by a camera device that photographs the plurality of partial areas of the object separately;

receiving a designation of an area to be reconfigured, included in the entire area of the object;

selecting automatically a plurality of frames which include image data of a portion corresponding to the designated area on the basis of the coordinate of the designated area; and reconfiguring the image data of the designated area on a buffer by using the image data of the portion included in the frames selected by said selecting.

19. The computer readable medium according to claim 18, wherein said buffering stores only the image data of the area overlapped with the designated area, out of the selected frames.

20. The computer readable medium according to claim 18, wherein said selecting changes the number of the frames to be selected, in accordance with the coordinate of the designated area.

21. The computer readable medium according to claim 18, wherein the program further comprising:

receiving a command including the designation from an outer device;

transmitting the composed image data to the outer device, in accordance with the command received by said receiving.

* * * * *

UNITED STATES PATENT AND TRADEMARK OFFICE
CERTIFICATE OF CORRECTION

PATENT NO. : 7,092,012 B2
APPLICATION NO. : 08/965213
DATED : August 15, 2006
INVENTOR(S) : Nakamura et al.

Page 1 of 1

It is certified that error appears in the above-identified patent and that said Letters Patent is hereby corrected as shown below:

In claim 13 (col. 14, line 62), please replace "convening" with --converting--.

Signed and Sealed this

Twenty-eighth Day of November, 2006

JON W. DUDAS
*Director of the United States Patent and Trademark Office*